United States Patent [19]

Arai

[11] 4,308,584
[45] Dec. 29, 1981

[54] APPARATUS FOR CONTROL OF MANIPULATOR

[75] Inventor: Tatsuo Arai, Urawa, Japan

[73] Assignees: Agency of Industrial Science & Technology; Ministry of International Trade & Industry, both of Tokyo, Japan

[21] Appl. No.: 102,784

[22] Filed: Dec. 12, 1979

[30] Foreign Application Priority Data

Dec. 20, 1978 [JP] Japan ............................ 53-159432

[51] Int. Cl.³ .................... G06F 15/46; G05B 19/42; B25J 9/00
[52] U.S. Cl. .................................... 364/513; 414/730
[58] Field of Search ...................... 364/513, 478, 474; 414/1, 2, 5, 730, 744, 749, 786, 774, 909; 318/568

[56] References Cited

U.S. PATENT DOCUMENTS

| | | | |
|---|---|---|---|
| Re. 28,437 | 6/1975 | Devol et al. | 364/513 X |
| 3,909,600 | 9/1975 | Hohn | 364/513 |
| 3,920,972 | 11/1975 | Corwin, Jr. et al. | 364/513 |
| 4,068,156 | 1/1978 | Johnson et al. | 364/478 X |
| 4,086,522 | 4/1978 | Engelberger et al. | 364/478 X |
| 4,166,543 | 9/1979 | Dahlstrom | 364/513 X |

*Primary Examiner*—Joseph F. Ruggiero
*Attorney, Agent, or Firm*—Kurt Kelman

[57] ABSTRACT

A method and apparatus for controlling a manipulator by establishing polynomials obtained, as the functions of two sets of command values, the one set representing the position and the other set representing the direction respectively of the manipulator hand, by approximating the values of angles of rotation prescribed for the drive mechanisms of the manipulator and the arm of the manipulator, subjecting the aforementioned polynomials to an arithmetic operation in electronic circuitry by use of the aforementioned objective-command values in conjunction with the coefficients of the aforementioned polynomials established in advance by calculation and thereby deriving angular magnitudes for the separate drive mechanisms of the manipulator and controlling the operation of the drive mechanisms based on the angular magnitudes.

2 Claims, 8 Drawing Figures

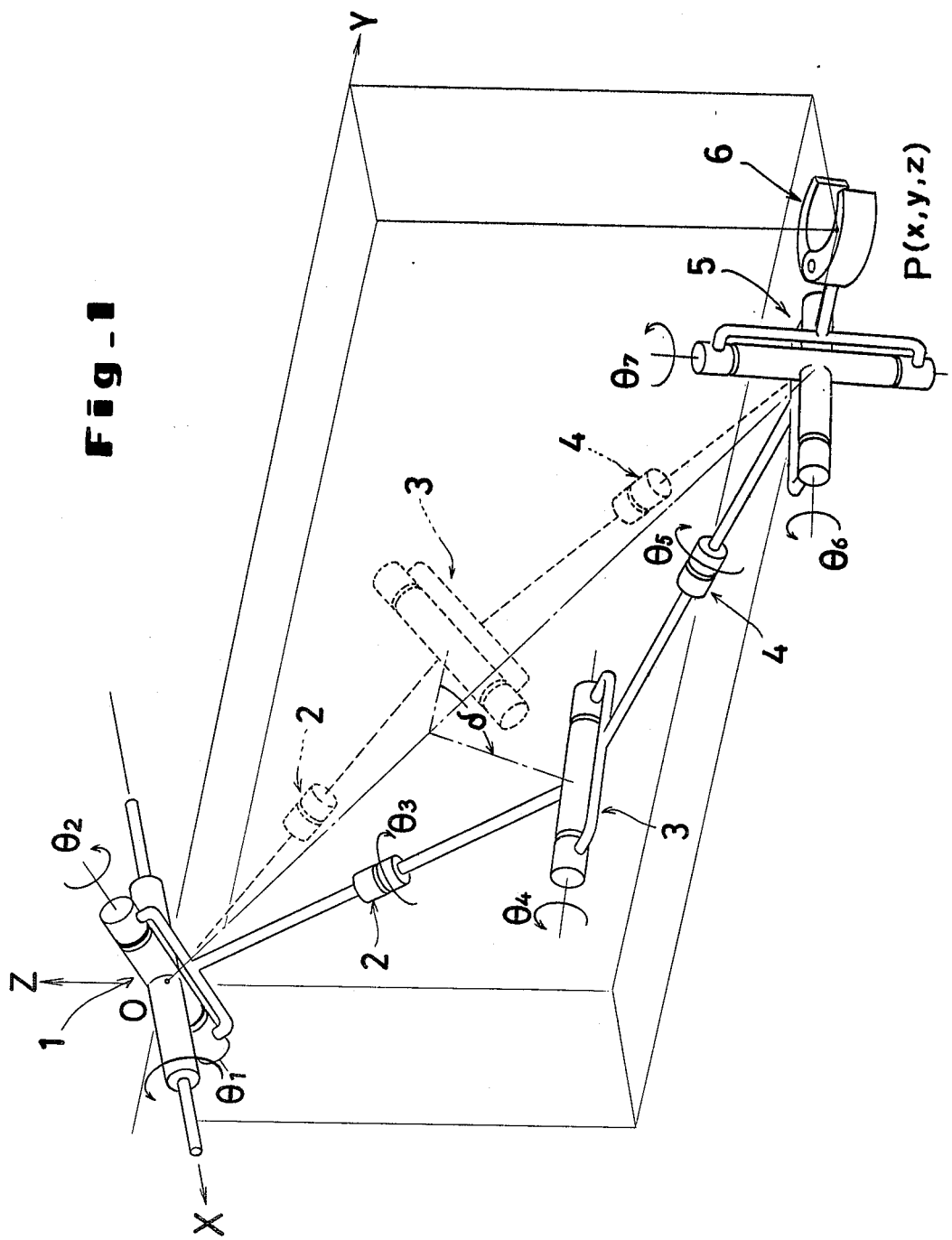

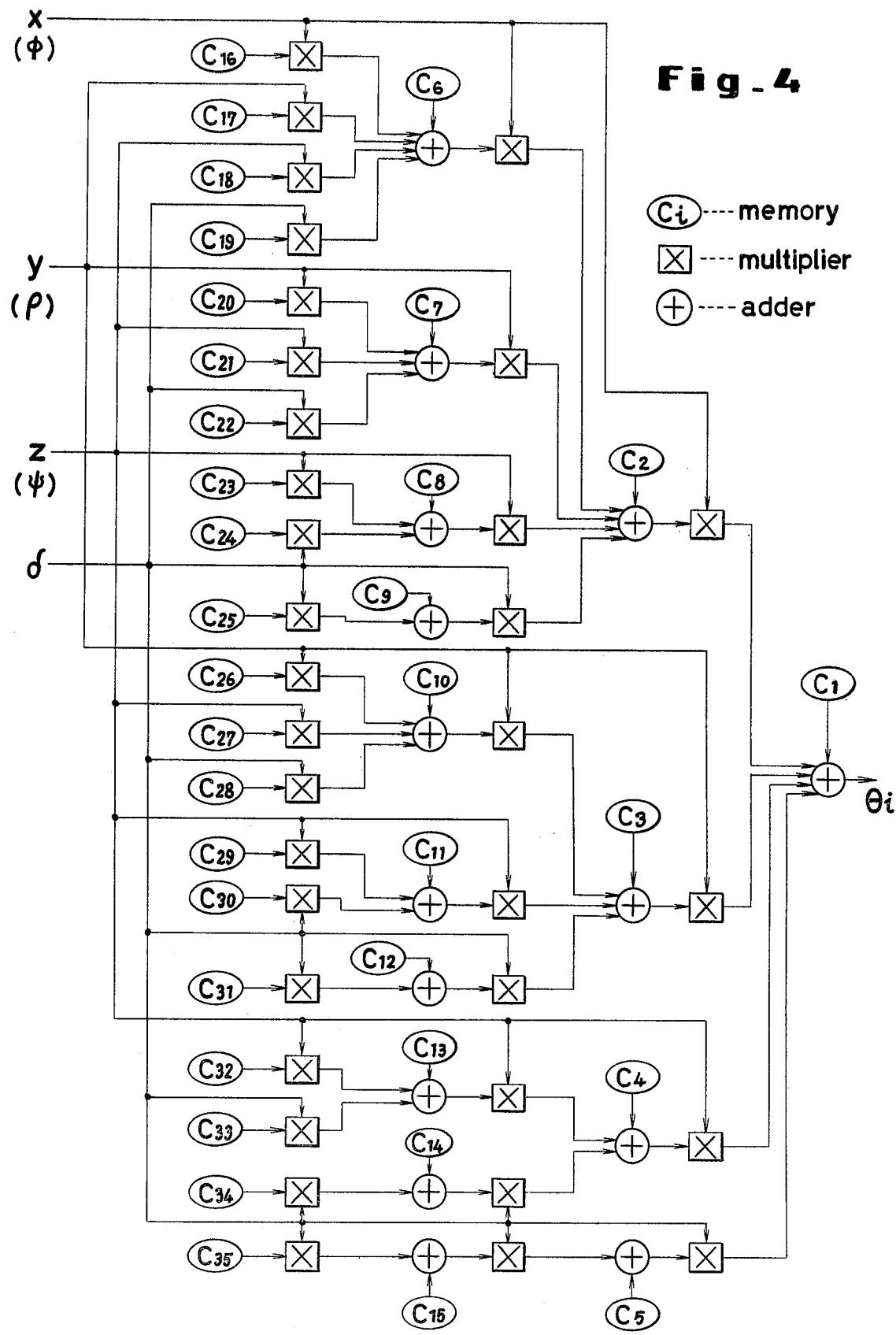

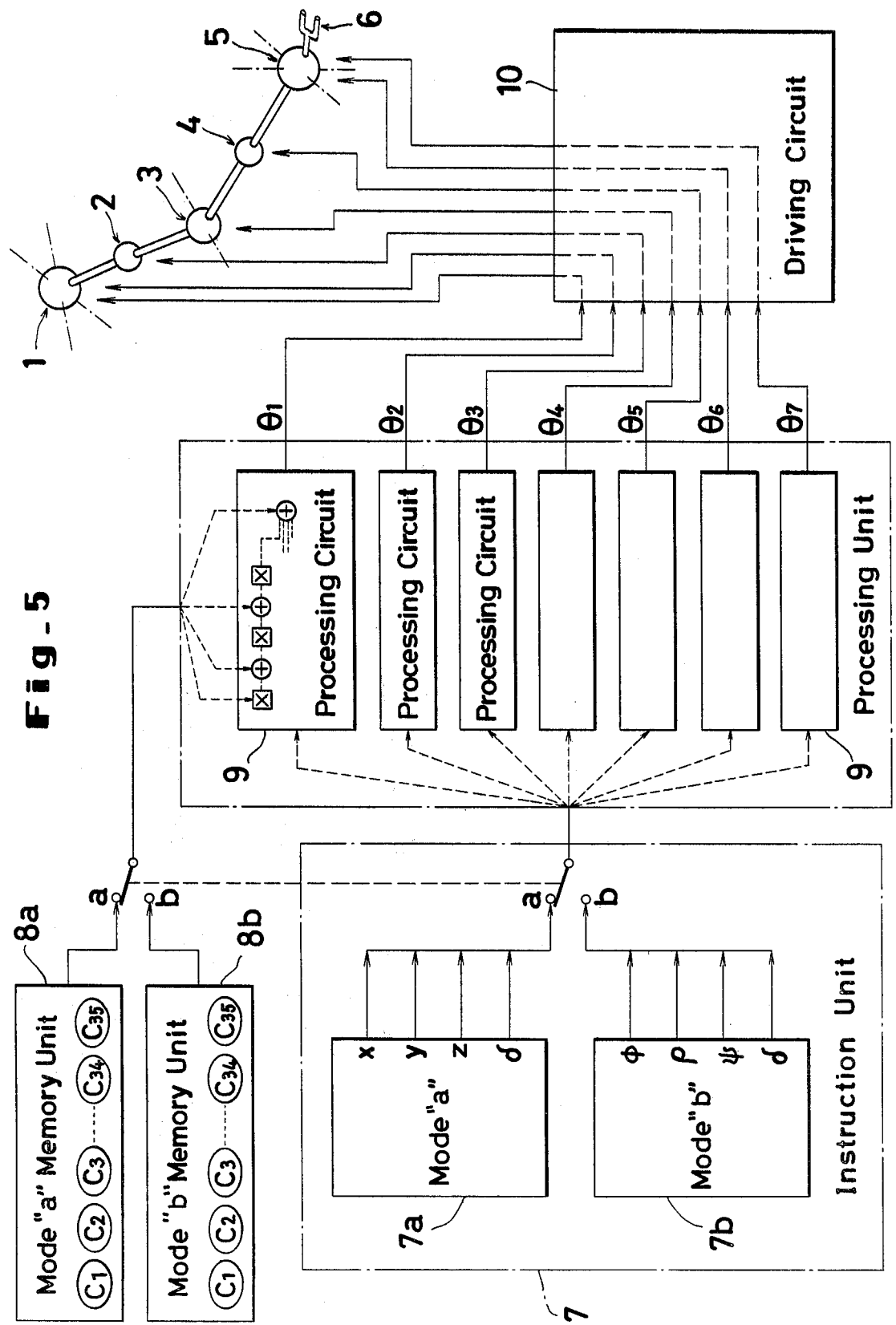

APPARATUS FOR CONTROL OF MANIPULATOR

BACKGROUND OF THE INVENTION

This invention relates to a method and apparatus for controlling a manipulator so as to enable the manipulator to reproduce faithfully and simply the motions of the human arm, for example.

In recent years, automation of machine tool and assembly machines has vastly increased. Performance of simple work by use of simple programs has already found wide acceptance. In contrast, the development of a robot of complicated mechanism which may well be called the ultimate aim in machine automation has made no appreciable progress. One of the obstacles that stand in the way of this development is the fact that the processing of given data inevitably necessitates use of a large-scale electronic processing system supported by complicate programs. As an inevitable consequence, systems currently available for the purpose produce motions at slow response and involve more energy loss than is reasonably acceptable. None of the systems developed to date meets the desired use satisfactory. In other words, materialization of highly efficient electronic circuitry or a simpler, more efficient way of carrying out data processing programs needed for the control can alone further the possibility that the motions produced by the human arms, for example, will be reproduced faithfully at quick response by use of machines. While the present invention will be described in connection with a manipulator adapted to provide effective reproduction of the motions of the human arm, it will be clearly understood by those skilled in the art that the control can be effectively applied to the reproduction of the motions of the other parts of the human body as well.

The human arm contains joints one each at the wrist, the elbow and the shoulder. The motions of the human arm involve seven degrees of freedom, namely, the combinations of the longitudinal and lateral motions of the wrist, the twisting (rotary) motion of the forearm, the flexing motion of the elbow, the twisting (rotary) motion of the brachium, and the combinations of the longitudinal and lateral motions of the shoulder. This means that reproduction of the motions of the human arm by the operation of a manipulator requires at least a total of seven axes of rotation. Generally, the manipulator can be oriented for the control of the reproduction of these motions by feeding to each of these axes of rotation necessary command signals which represent angular magnitudes of motions to be calculated in accordance with the data on the coordinates of all positions and the angular values of all directions that can be possibly assumed by the arm. For the optimization of this control, it is definitely necessary to use an arithmetic unit which permits highly complicated programs involving the arithmetic operations of trigonometric functions, inverse trigonometric functions and matrices and incorporates a huge memory circuitry.

As regards the system touched upon above, the invention titled "Method for control of multi-joint type manipulator" published in Japanese Laid-open Patent Publication No. 98867/1976 has offered some improvement in and concerning the complicated arithmetic operations to be performed on a real-time basis. To be specific, this method comprises dividing the whole area covered by all possible motions of the manipulator hand into sections resembling those of lattices, calculating in advance the angles which are assumed by the joints of the arm on given lattice points as the hand is posed on such lattice points, and storing the data consequently obtained in a memory unit, on condition that data on the angles of the joints falling at intermediate points of the aforementioned lattice sections are calculated by means of interpolation. This method has the merit of relieving the arithmetic unit of the arithmetic operations of trigonometric functions which have heretofore consumed the greater part of the time required for the real-time processing of data. While this method permits a fairly large cut in the time required for data processing, it nevertheless necessitates use of an arithmetic unit possessing a huge memory capacity for storing comprehensive data covering all the motions that can be produced by the manipulator hand in the prescribed area. Worse still, this method suffers from inferior accuracy of data calculation because it relies on calculations which make use of lattice points and interpolation. This method lacks practical feasibility and is merely experimental.

An object of this invention is to provide a method for controlling a manipulator by simple operations involving, as the objective-command values, the coordinates indicating the positions of the hand, the Euler's angles indicating the directions of the hand, and the angles of rotation of the elbow for thereby enabling the mechanisms of the manipulator capable of rotating and moving the joints and the whole arm of the manipulator to reproduce the motions of the human arm faithfully in rapid response, and an apparatus for effecting the aforementioned control of the manipulator mechanisms without necessitating any large memory capacity.

SUMMARY OF THE INVENTION

To accomplish the object described above according to the present invention, there is provided a method for controlling a manipulator, which method comprises prescribing two types of control modes, the one type for actuating the manipulator by using, as the objective-command value, the coordinates of the position to which the hand is desired to be moved and the other type for actuating the manipulator by using, as the objective-command value, the Euler's angle indicating the direction in which the hand is desired to point relative to the axes of the coordinate system; approximating the angular magnitudes of rotation in the drive mechanisms and the whole arm of the manipulator with polynomials involving functions of the aforementioned objective-command values with respect to the separate types of control modes; subjecting to calculation the aforementioned polynomials with respect to the points of the coordinate system selected in the space for the manipulator's operation and the data on the angular magnitudes determined of the direction of the hand, thereby establishing coefficients of the polynomials with respect to the separate type of control modes; performing an arithmetic operation on the aforementioned approximate polynomials using as substitutes therein the objective-command values corresponding to the separate types of control modes, thereby determining a desired set of information on the angular magnitudes of rotation; and forwarding the set of information to the aforementioned drive mechanisms.

Since the polynomials which have served to establish the angular magnitudes of rotation for the individual drive mechanisms are approximated to a degree not detrimental to faithful reproduction of the motions of the human arm by the manipulator, the time required for the performance of arithmetic operation of such polynomials in the electronic circuitry is shortened. The division of the manipulator motions into two modes results in a notable decrease in the number of terms involved in the individual approximate polynomials and consequently a substantial reduction in the time required for the electronic processing of the arithmetic operation. Further, the configuration of the electronic circuits needed for the arithmetic operation is simplified by the same token. The addition of the angular magnitudes of the rotation of the elbow to the objective-command values with respect to the separate control modes enables the manipulator to reproduce motions equivalent to the motions of the seven degrees of freedom obtainable with the human arm. The manipulator, therefore, provides highly faithful reproduction of the motions.

The other objects and characteristics of the present invention will become apparent from the further description of the invention to be given hereinafter with reference to the accompanying drawing.

BRIEF EXPLANATION OF THE DRAWING

FIG. 1 is a perspective view schematically illustrating the mechanism of the manipulator to which the apparatus of the present invention is applied.

FIG. 4 is a block circuit diagram illustrating the arithmetic circuitry in the control apparatus of the present invention.

FIG. 5 is a block diagram illustrating the construction of the control apparatus of the present invention.

DESCRIPTION OF PREFERRED EMBODIMENT

This invention will be described in connection with an apparatus for controlling a manipulator to reproduce faithfully and simply human arm motions.

Figure 2A:
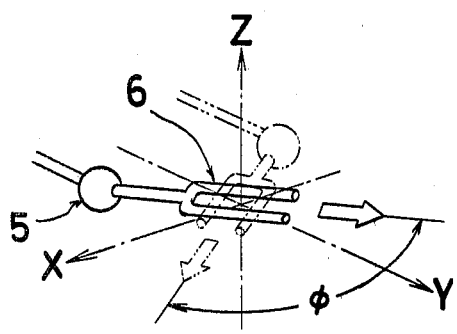
FIGS. 2(A), 2(B) and 2(C) are explanatory diagrams showing the directions of the hand of the manipulator of FIG. 1 as analyzed by Euler's angles.
Figure 2B:
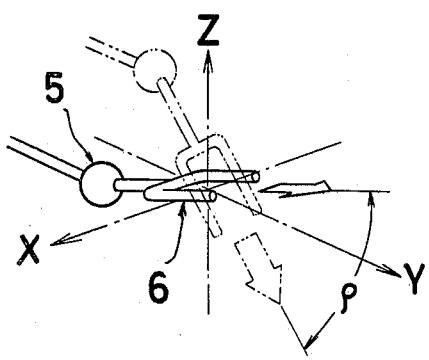
Figure 2C:
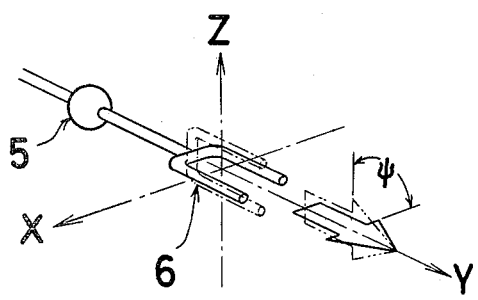

Generally, the manipulator is expected to reproduce faithfully the motions of the human arm with seven degrees of freedom and, therefore, is provided with seven drive shafts corresponding to the aforementioned seven degrees of freedom. FIG. 1 schematically illustrates, in an easily understood manner, the drive mechanism of a typical human arm. The manipulator is composed of a shoulder 1, a brachium 2, an elbow 3, a forearm 4, a wrist 5 and a hand 6. In the shoulder 1 and the wrist 5, respectively two perpendicularly intersecting drive shafts are used to impart freedom to the motions of the brachium and the hand. Two control commands must be given to the manipulator, the one command representing the information as to the position of the place P at which an object to be seized by the hand 6 is located and the other command representing the information as to the degree of twist to be made in the hand so that the aforementioned object is seized by the hand in a desired direction. In this embodiment, the space for the operation of the manipulator is given by a rectangular coordinate system wherein the shoulder of the manipulator is fixed at the origin O. The information as to the position is expressed in terms of the coordinates (x, y, z) of the place P and the information as to the degree of the hand's twist is expressed in terms of the Euler's angles ($\phi$, $\rho$, $\psi$) relative to the axes of the coordinate system in the space for the hand's operation as illustrated in FIG. 2. This means that when the driving angles $\theta_i$ of the drive shafts at the separate joints are fixed in advance by using, as the variables, the aforementioned six objective-command values corresponding to the six degrees of freedom, the position and the degree of twist of the manipulator's hand can be controlled with the six objective-command values. Further in the present invention, the rotational angle $\delta$ of the elbow is to be designated in addition to the aforementioned six objective-command values, whereby the elbow 3 is allowed, as when its expected path of motion happens to collide with some obstacle standing in the way of the path during the operation of the manipulator, to take a changed path avoiding the obstacle by having the brachium and the forearm suitably twisted in much the same way as is done by the human arm. This rotational angle $\delta$ is determined from the rotation of the elbow around the straight line interconnecting the shoulder 1 and the wrist 5.

The angular magnitudes, $\theta_1$ to $\theta_7$, for the separate joints can easily be found by designating the aforementioned variables (x, y, z, $\phi$, $\rho$, $\psi$, $\delta$) as the objective-command values. In the conventional system, since the arithmetic operation performed to determine these angular magnitudes has involved numerous expressions including trigonometric functions, inverse trigonometric functions and matrices, the arithmetic operation has required a great deal of time and a large-scale apparatus. The present invention is based on the discovery of the fact that the following functional relationship exists between the aforementioned angular magnitudes, $\theta_1$ to $\theta_7$, and the seven variables of the objective-command values.

$$\theta_i = f_i(x, y, z, \phi, \rho, \psi, \delta) \tag{1}$$

wherein, i=1, 2, 3, 4, 5, 6 and 7. Judging from the motions of the human arm, "f" represents a very smoothly varying function. The formula, therefore, can be approximated in the form of an N-order polynomial involving the variables of the objective-command values, as shown below.

$$\theta_i = \sum_{j=1}^{Q} C_{ij} P_j(x, y, z, \phi, \rho, \psi, \delta) \tag{2}$$

$$P_j(x, y, z, \phi, \rho, \psi, \delta) = x^k y^l z^m \phi^n \rho^p \psi^q \delta^r \tag{3}$$

wherein, $1 \leq i \leq 7$; k, l, m, n, p, q, and r are each an integer; $0 \leq (k+l+m+n+p+q+r) \leq N$ and the coefficient $C_{ij}$ is fixed as will now be described.

First, a few representative points are selected within the space for the manipulator operation and used as the coordinates of the positions of the hand. For each of these representative points, several sets of the variables $\phi$, $\rho$, $\psi$, and $\delta$ are selected. In the working examples of this invention, $\delta = 0°-60°$ has been established. Then, the angular magnitudes $\theta_1$ to $\theta_7$ for the separate joints are accurately calculated with reference to the position and the rotation of the hand and the rotational angle of the elbow determined as described above. The variables (x, y, z, $\phi$, $\rho$, $\psi$, $\delta$) and the angular magnitudes thus found are used as sample data. The coefficient $C_{ij}$ can be calculated by the least squares method using the sample data.

When the approximate polynomials are established as described above, the accuracy of the resultant motion of the manipulator is heightened in direct proportion to the number of orders. Unfortunately, the increase in the number of orders involved in these polynomials results in a proportional addition to the time needed for the arithmetic operation, and the addition of time contradicts the object of shortening the time requirement. Where the number of orders involved in the approximation is 3, for example, the number of terms (i.e. Q) involved in the expression used for determining just one angular magnitude rises to 120. If this arithmetic operation is performed by means of electronic circuitry, then the circuitry and the time required are both too large for the system to enjoy reasonable feasibility.

In view of the difficulty touched upon above, the present invention appreciably decreases the number of terms involved in the expressions used in the arithmetic operation by adopting two types of control modes for the actuation of the manipulator. As a result, this invention makes possible a notable reduction in the time required for the arithmetic operation.

Figure 3A:
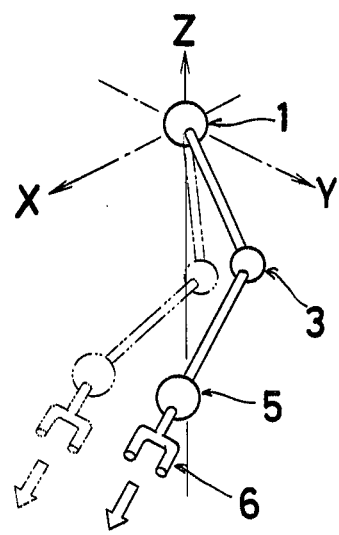
FIGS. 3(A) and 3(B) are explanatory diagrams illustrating the division of the motions of the manipulator of FIG. 1 into two modes.
Figure 3B:
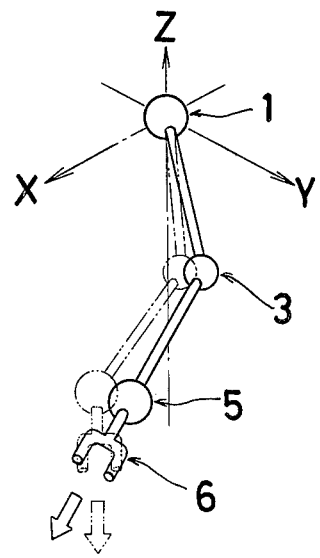

The modes of the manipulator operation can be divided into two types of control modes, i.e. the one type (mode "a") for designating the travel of the hand by means of the coordinates (x, y, z) of the position of the hand as shown in FIG. 3(A) and the other type (mode "b") for designating the degree of twist of the hand by means of the Euler's angles ($\phi$, $\rho$, $\psi$) as shown in FIG. 3(B). The desired control of the manipulator operation can be obtained by adding the information on the rotational angle $\delta$ of the elbow to the separate control modes described above. As a result, the following relations are satisfied with respect to the two control modes.

(Mode "a")   $\theta_i = f_i(x, y, z, \delta)$   (4)

(Mode "b")   $\theta_i = f_i(\phi, \rho, \psi, \delta)$   (5)

wherein the expression $1 \leq i \leq 7$ holds, namely each control mode is capable of controlling all the angular rotations ($\theta_1$ to $\theta_7$) for the separate joints. This is because the control mode "a" only designates the change of the position of the hand without involving any change in the direction of the hand, whereas the control mode "b" only designates the change of the direction of the hand without involving any change in the position of the hand.

Similarly to the approximation of the formula (1) into the polynomials of the formulas (2) and (3), the formulas (4) and (5) can be approximated into the following equations. (Hereinafter, the coefficients will be fixed at $C_i$.)

$$\begin{aligned}\theta_i =\ & C_1 + x\{C_2 + x(C_6 + C_{16}x + C_{17}y + C_{18}z + C_{19}\delta) \\ & + y(C_7 + C_{20}y + C_{21}z + C_{22}\delta) \\ & + z(C_8 + C_{23}z + C_{24}\delta) \\ & + \delta(C_9 + C_{25}\delta)\} \\ & + y\{C_3 + y(C_{10} + C_{20}y + C_{27}z + C_{28}\delta) \\ & + z(C_{11} + C_{29}z + C_{30}\delta) \\ & + \delta(C_{12} + C_{31}\delta)\} \\ & + z\{C_4 + z(C_{13} + C_{32}z + C_{33}\delta) \\ & + \delta(C_{14} + C_{34}\delta)\} \\ & + \delta\{C_5 + \delta(C_{15} + C_{35}\delta)\}\end{aligned} \quad (6)$$

Formula (6) represents an approximation with respect to the control mode "a." When the variables (x, y, z, $\delta$) in this approximate equation are substituted by the analogous variables ($\phi$, $\rho$, $\psi$, $\delta$), the equation is automatically converted into an approximate equation applicable to the control mode "b." Although the coefficients $C_i$ are variable between the two control modes, no such variation by the control mode occurs in the case of the system pattern which is involved when the arithmetic operation of the approximate equation of Formula (6) is carried out in the electronic processing circuitry of a state construction as shown in FIG. 4. It is clear from FIG. 4 that by approximating the equation of Formula (4) or (5) to that of Formula (6), there can be obtained a desired processing circuit consisting of 35 memory elements corresponding to the number of the coefficients $C_i$, 15 adders and 34 multipliers per each degree of freedom ($\theta_i$). The approximation, therefore, serves the purpose of permitting great simplification of circuitry and providing a generous reduction in the time needed for the arithmetic operation.

With reference to the block diagram of FIG. 4 illustrating the processing circuitry for the arithmetic operation, when the objective-command values representing the information on the position of the hand (x, y, z) and the rotational angle ($\delta$) of the elbow are introduced by the control mode "a" and those representing the information on the degree of a twist ($\phi$, $\rho$, $\psi$) and the rotational angle ($\delta$) of the elbow by the control mode "b" respectively into the processing unit, multiplication is effected in the first stage between the objective-command values of each control mode and the values of coefficients issued from the memory elements $C_{15}$ to $C_{35}$ corresponding to the control mode, addition is effected in the second stage between at least one of the products of multiplication obtained in the preceding stage and the values of coefficients issued from the prescribed memory elements $C_6$ to $C_{15}$, and subsequently the multiplication and the addition mentioned above are repeated on the remaining terms of the equation of Formula (6). As a result, the angular magnitudes $\theta_1$ to $\theta_7$ for the separate joints are delivered in the respective modes through the output terminals.

The processing circuit illustrated in FIG. 4 constitutes each of the plurality of circuits 9 arranged parallelly to one another in the control apparatus shown in the block diagram of FIG. 5. The number of these circuits 9 equals that of the degrees of freedom to be controlled by the control apparatus. Since the present embodiment utilizes seven degrees of freedom, the control apparatus is provided with a total of seven processing circuits 9. When command signals are received from the instruction unit 7, these processing circuits simultaneously start processing data. The coefficient memory elements $C_i$ shown in FIG. 4 are disposed in the separately installed memory units 8a, 8b in the overall configuration of FIG. 5.

The control of the manipulator operation is commenced by causing the objective-command values representing the coordinates (x, y, z) of the position of the hand and the rotational angle ($\delta$) of the elbow to be introduced by the control mode "a" into the instruction unit. Thereupon, the Mode "a" signal generator 7a is actuated to deliver the command signals (x, y, z) to the relevant processing circuits 9 and the processing circuits 9, on separately receiving the coefficient signal from the Mode "a" memory unit 8a operating synchronously with the prevalent mode of the instruction unit, start processing the received data and discharge the angular magnitudes $\theta_1$ to $\theta_7$ through their output terminals. The values of these output data are forwarded via the manipulator driving circuit 10 to the respective drive mechanisms of the manipulator.

After the objective-command values of the mode "a" have been introduced into the instruction unit, the objective-command values of the mode "b" are similarly fed to the instruction unit. Thereupon, the instruction unit and the memory unit are switched to the corresponding mode "b" to perform the data processing of that mode similarly to that of the mode "a." The arithmetic operation in this case is performed in the number of stages proper to the prevalent mode. In the case of the present embodiment, the arithmetic operation requires time for three stages each of multiplication and addition, namely, a total of six stages of operation. In the electronic circuit, the data processing of this size consumes only a trifling amount of time. In fact, the time needed for the data processing is so small that the control of the manipulator operation is carried out practically on a real-time basis.

The aforementioned approximation of the equations is thought to affect slightly the accuracy of the operation of the manipulator for the positioning of the hand. Through an actual experiment it has been ascertained, however, that the approximation results in an error too minor to produce any adverse effect on the practical utility of the manipulator.

Now the accuracy of the operation of the manipulator control apparatus as established by the aforementioned actual experiment will be described. In this experiment, a model manipulator wherein a brachium and a forearm each had a length of 40 cm was controlled within the space for operation, which was one fourth of the space enclosed by a sphere described by the rotation of the arm in all possible directions with the shoulder as the origin, namely, a quarter section of the spherical space defined by a positive domain in respect of the y-axis and a negative domain in respect of the z-axis of the coordinate system shown in FIG. 1.

In this experiment, the error of the position of the wrist was found to be 0.63 cm on the average, with the standard deviation being at 0.63 cm and the maximum being 2.6 cm. This means that the error occurring within the aforementioned space for operation is only a few percent which is virtually negligible from the standpoint of the actual use of the manipulator. Where a further improvement is desired to be made in the accuracy, the space for operation can be divided and varying, more elaborate approximate equations established for the separate sections of the space so that the manipulator operation will be controlled with enhanced faithfulness. In case where the number of degrees of freedom can be decreased on the account of the particular purpose of the control, the number of processing circuits may be proportionately decreased. The number of processing circuits may be increased as the occasion arises. The present invention need not fix the number of degrees of freedom at 7. In the case of the manipulator control which has no use for the rotational angle ($\delta$) of the elbow, the objective-command value representing this rotational angle ($\delta$) can be completely eliminated from the arithmetic operation or the function concerning this objective-command value can be omitted from the overall configuration of the control apparatus at the time that the apparatus is designed. In this case, it is only natural that the terms involving this value $\delta$ should be excluded from the equation of Formula (6) and the time needed for the arithmetic operation should be proportionately decreased.

As described above, the control apparatus provided by the present invention permits the angular magnitudes at the respective joints of the human arm manipulator to be calculated accurately at a high speed by use of a simple circuitry formed of specific combinations of multipliers and adders. Further, the control apparatus has the advantage that the capacity for memory need not be large by any standard and the arrangement of electronic elements is quite simple. It also claims the conspicuous merit of materializing real-time control of the manipulator operation, which has never been obtained by the conventional control technique resorting to the arithmetic operation which involves trigonometric functions.

What is claimed is:

1. An apparatus for controlling a manipulator which is composed of a mechanical arm having an elbow, a joint at the elbow enabling the elbow to rotate, a mechanical hand, a joint connecting the hand to the arm and enabling the hand to rotate and drive mechanisms installed at the joints and operative to move a portion of the arm between the elbow and the hand as well as the hand in response to command signals representing the positional coordinates of the mechanical hand in an operational coordinate system, which apparatus comprises:

an instruction unit incorporating two mode-signal generators for delivering two sets of command signals for two mode operations, one of said mode operations designating positional change of the mechanical hand without involving any change in the direction of the hand and the other mode operation designating directional change of the hand without involving any change in the position of the hand, one set of said command signals for the mode operation designating the positional change of the hand being expressed in terms of the positional coordinates of the hand and the rotational angle of the elbow and the other set of command signals being expressed in terms of Euler's angles relative to the axes of the coordinate system for the hand and the rotational angle of the elbow;

(b) a pair of separately installed memory units for the respective mode operations, in which the coefficients of approximate polynomials involving functions of the command signals for the rotational angles of the respective drive mechanisms with respect to the two mode operations are stored;

(c) a processing unit composed of processing circuits relative to the respective drive mechanisms, each of said processing circuits having multipliers and adders and capable of performing any arithmetic operation on said polynomial by receiving said command signals for either mode operation from the instruction unit and the coefficients stored in the memory unit for the relative mode operation, thereby discharging value signals representing rotational angles of the respective drive mechanisms; and (d) a drive control unit serving to convert the value signals discharged from said processing unit into drive power signals for the respective drive mechanisms and to deliver the drive power signals to the drive mechanisms;

whereby the manipulator is actuated by means of the drive power signals so as to direct the mechanical hand thereof in the desired direction at the desired position.

2. The manipulator controlling apparatus of claim 1, wherein the mechanical arm has a shoulder opposite the joint connecting the hand to the arm, a joint at the shoulder enabling the shoulder to rotate, a joint at an arm portion between the shoulder and the elbow, a joint at an arm portion between the elbow and the joint connecting the hand to the arm, and further drive mechanisms installed at the joints between the shoulder and the elbow and between the elbow and the joint connecting the hand to the arm to move the arm portions in response to command signals.

* * * * *